United States Patent [19]

Sundet

[11] Patent Number: 4,529,646
[45] Date of Patent: Jul. 16, 1985

[54] PRODUCTION OF COMPOSITE MEMBRANES

[75] Inventor: Sherman A. Sundet, Wilmington, Del.

[73] Assignee: E. I. Du Pont de Nemours and Company, Wilmington, Del.

[21] Appl. No.: 666,918

[22] Filed: Oct. 31, 1984

Related U.S. Application Data

[62] Division of Ser. No. 635,746, Jul. 30, 1984.

[51] Int. Cl.$^3$ .............................................. B32B 3/26
[52] U.S. Cl. .............................. 428/315.5; 210/500.2; 210/654; 427/246; 427/340; 428/419; 521/53; 521/57; 521/58; 521/62; 521/64; 521/189
[58] Field of Search ...................... 521/53, 62, 65, 189; 427/244, 246, 340; 428/315.5, 419; 210/500.2, 654

[56] References Cited

U.S. PATENT DOCUMENTS

| | | | |
|---|---|---|---|
| 3,926,798 | 12/1975 | Cadotte | 427/246 |
| 4,039,440 | 8/1977 | Cadotte | 264/41 |
| 4,277,344 | 7/1981 | Cadotte | 427/243 |

*Primary Examiner*—Morton Foelak

[57] ABSTRACT

A process is disclosed for producing a composite reverse osmosis membrane. The process involves forming a porous polysulfone membrane from a solution of polysulfone followed by quenching the polysulfone membrane in an aqueous solution of m-phenylenediamine followed by reacting the m-phenylenediamine on the polysulfone membrane with either trimesoyl chloride or cyclohexane-1,3,5-tricarbonyl chloride in a water immiscible solution thereof.

1 Claim, No Drawings

PRODUCTION OF COMPOSITE MEMBRANES

CROSS REFERENCE TO RELATED APPLICATION

This application is a division of Ser. No. 635,746 filed July 30, 1984.

BACKGROUND OF THE INVENTION

1. Field of the Invention

The present invention relates to a process for preparing a composite reverse osmosis membrane by casting a porous polysulfone membrane followed by in situ polymerization of m-phenylenediamine and various polyfunctional acid chlorides to form a thin film on the porous polysulfone membrane.

2. Prior Art

U.S. Pat. No. 3,926,798 discloses a composite reverse osmosis membrane comprising a support film, such as a polysulfone, and a layer of acid polymerized furfuryl alcohol.

U.S. Pat. No. 4,039,440 discloses a composite reverse osmosis membrane prepared on a support such as a polysulfone. Polyethylenimine is deposited on the support from an aqueous solution and treated with a polyfunctional reagent to form the membrane.

U.S. Pat. No. 4,277,344 discloses a composite reverse osmosis membrane which in its preferred form is an ultrathin membrane of poly(phenylenediamine trimesamide) on a porous polysulfone support. The membrane is formed by casting a solution of polysulfone on a surface, partially evaporating the solvent, quenching the thus partially formed porous support member in water to gel the polymer, impregnating the support member with phenylene diamine and treating the support member with a solution of trimesoyl chloride to form the reverse osmosis membrane having an ultrathin layer of poly(phenylenediamine trimesamide) on a porous polysulfone support.

SUMMARY OF THE INVENTION

The process of the present invention involves casting a solution of a polysulfone onto a support surface and quenching the resulting member in an aqueous solution of m-phenylenediamine to gel the polysulfone, form the porous membrane support and impregnate the support with m-phenylenediamine. The excess aqueous solution is removed and the impregnated membrane is then treated with a dilute solution of polyfunctional acid chloride such as trimesoyl chloride, 1,3,5-cyclohexane tricarbonyl chloride or mixtures thereof which rapidly reacts with the m-phenylenediamine to form an ultrathin membrane supported by the porous polysulfone.

DETAILED DESCRIPTION

The first step of the present invention is to prepare a microporous substrate or support from an aromatic polysulfone. The preferred polysulfone substrates ultimately have pores of less than about 20 nanometers in diameter. This is readily accomplished by casting from a 10 to 20 weight % and preferably 14–16 weight % solution of the polysulfone in a polar organic solvent. The preferred solvent is dimethyl formamide but other polar solvents such as dimethyl acetamide and N-methylpyrrolidone may also be used.

The next step in the process is critical in the present invention. The freshly cast polysulfone substrate is immediately quenched in an aqueous solution containing 0.1–10% by weight, preferably 0.5–5% by weight and most preferably 1–3% by weight of m-phenylenediamine. By immediately, we mean within 30 seconds and preferably within 3 seconds. Even with this short a period between casting and quenching partial evaporation of the solvent can occur. Alternatively the polysulfone solution can be directly cast or extruded into the aqueous solution of m-phenylenediamine. This serves to load the polysulfone substrate with m-phenylenediamine. The concentration of the diamine is an important factor in the performance of the resulting composite since it may control the uniformity and thickness of the ultimate polyamide supported on the substrate. If the coating is non-uniform, it is apt to have or develop small holes which adversely affects salt rejection of the membrane. Optionally the diamine solution can contain up to 10 weight % polar organic solvent such as dimethyl formamide. Excess solution is removed from the surface of the substrate by a drawing, rolling, sponging or other suitable procedure such as the use of an air-knife.

The loaded substrate is then immersed in a solution of trimesoyl chloride, cyclohexane-1,3,5-tricarbonyl chloride, or mixtures thereof, optionally containing isophthaloyl chloride or terephthaloyl chloride, in a water-immiscible solvent, which does not adversely affect the porous structure of the polysulfone substrate, for 5–90 and preferably 10–30 seconds at room temperature. The preferred solvents for this step are hexane and the chlorofluorocarbons such as trichlorotrifluoroethane. Formation of the polyamide causes the originally shiny substrate to develop a dull finish.

The resulting composite is then dried at temperatures of 20°–100° C., preferably 50°–70° C. for 5–180 seconds, preferably 15–60 seconds or longer periods of time at the lower temperatures.

The residual diamine and reaction by-products are then extracted by soaking in water.

The membranes of the present invention exhibit improved water flux or salt rejection over membranes which have been quenched in water and then treated with an aqueous solution of diamine prior to reaction with acid chloride.

EXAMPLES

Membrane Testing

Unless otherwise indicated, all permeability properties were determined with a solution of 32–33 g/l of NaCl in magnetically stirred permeation cells at the indicated pressures at ambient temperatures after a brief break-in period of about 15–20 minutes involving a subsequent period of ½–1 hour during which the actual measurements were being taken. The results are expressed as % NaCl rejected, and Kw in units of meters per second per TeraPascal.

$$R = \left(1 - \frac{C_p}{C_f}\right) 100$$

where $C_p$ is the concentration of NaCl in the permeate and $C_f$ is the concentration of NaCl in the feed.

Kw = Flux/Effective Pressure where flux is the flow rate through the membrane, and effective pressure = feed pressure − opposing osmotic pressure. Kw is reported in $m.s^{-1}.TPa^{-1}$.

EXAMPLES 1–3

A microporous polysulfone substrate was prepared from a 15% solution of a polysulfone derived from bisphenol A and p,p'-dichlorodiphenyl sulfone (Udel® P3500, from Union Carbide) having a molecular weight of about 35,000 in dimethylformamide. With the casting knife set at 6 mils, the casting produced on a glass plate at room temperature was quenched within 3 secs. in an aqueous solution of 5% by weight dimethylformamide, and 2% by weight m-phenylenediamine (MPD), at 22°–25° C. for the time indicated, then extracted in aqueous 2% by weight m-phenylenediamine as indicated for the times indicated in Table I. After rolling with a sponge rubber roller, the membrane was reacted with a Freon® TF (1,2,2-trichloro-1,1,2-trifluoroethane) solution containing 0.1% w/v of trimesoyl chloride for 30 secs. at room temperature before drying overnight at room temperature. The membranes were extracted in water at 23°±1° C. for 60 minutes prior to testing.

TABLE I

| Example | Quench Mins | Extract Mins | At 800 psi R % | Kw | At 1000 psi R % | Kw |
|---|---|---|---|---|---|---|
| 1 | 1 | 1 | 96.5 | 4.45 | 97.6 | 4.81 |
|   |   |   | 96.0 | 4.83 | 96.8 | 5.05 |
| 2 | 2 | 2 | 98.0 | 4.13 | 98.8 | 4.38 |
|   |   |   | 98.3 | 4.19 | 98.9 | 4.81 |
| 3 | 4 | 4 | 96.1 | 4.13 | 98.3 | 4.69 |
|   |   |   | 97.7 | 4.07 | 98.4 | 4.69 |

CONTROL EXAMPLES 5–8

A microporous substrate was prepared from a 15% solution in dimethylformamide of a polysulfone Udel® P3500. With the casting knife set at 6 mils, the casting produced on a glass plate at room temperature was quenched within 3 seconds in water at 22°–23° C., extracted fifteen minutes in water, then soaked for 3 minutes in aqueous m-phenylenediamine as indicated in the Table. After rolling with a sponge rubber roller, the membrane was reacted with a Freon® TF solution containing trimesoyl chloride and m-phenylenediamine as indicated in Table II for 30 seconds before drying at room temperature overnight. Each membrane was extracted for 60 minutes in distilled water before testing as in Examples 1–4.

TABLE II

| Example | m-Phenylenediamine % | Trimesoyl chloride % w/v | Test Results at 1000 psi R | Kw |
|---|---|---|---|---|
| 4 | 1.7 | 0.08 | 0.949 | 2.61 |
|   |     |      | 0.976 | 2.80 |
| 5 | 1.7 | 0.12 | 0.960 | 2.00 |
|   |     |      | 0.967 | 2.58 |
| 6 | 2.0 | 0.10 | 0.987 | 3.26 |
|   |     |      | 0.981 | 2.97 |
| 7 | 2.3 | 0.08 | 0.957 | 2.11 |
|   |     |      | 0.974 | 2.97 |
| 8 | 2.3 | 0.12 | 0.984 | 2.58 |
|   |     |      | 0.949 | 2.54 |

Examples 9 and 10 were run for intercomparison with short quench and extraction times, to see if the MPD only in the extraction bath would do as good a job as the MPD in the quench and the extraction step. Again it helps to have the MPD in the quench.

EXAMPLES 9 and 10

A microporous substrate was prepared from a 15% solution in dimethylformamide of a polysulfone (Udel® P3500) derived from bisphenol A and p,p'-dichlorodiphenylsulfone and having a molecular weight of about 35,000. With the casting knife set at 6 mils, the casting produced on a glass plate was quenched within three seconds in an aqueous quench containing 5% by weight of dimethylformamide and the amount of m-phenylenediamine reported in Table III for two minutes, then extracted in aqueous m-phenylenediamine (2% w/w) for 2 minutes more. After rolling with a sponge rubber roller, the membrane was reacted with a Freon® TF solution containing 0.12% w/v of trimesoyl chloride for 40 seconds before drying at room temperature overnight. The membranes were extracted in water for 60 minutes before testing.

TABLE III

| Quench % MPD | At 800 psi R % | Kw | At 1000 psi R % | Kw |
|---|---|---|---|---|
| 0 | 98.2 | 1.88 | 98.8 | 2.08 |
|   | 97.3 | 2.81 | 98.2 | 2.94 |
| 2 | 97.9 | 2.84 | 98.6 | 2.98 |
|   | 98.8 | 3.94 | 99.2 | 4.28 |

EXAMPLES 11–14

Procedure as in Example 2, but with m-phenylenediamine in both a two minute quench and a two minute extraction at concentrations as indicated below (at room temperature), and with two different levels of trimesoyl chloride (TMesCl).

TABLE IV

| Example | MPD % | TMesCl % w/u | At 800 psi R % | Kw | At 1000 psi R % | Kw |
|---|---|---|---|---|---|---|
| 11 | 1.5 | 0.07 | 97.1 | 3.13 | 97.9 | 3.46 |
| 12 | 1.5 | 0.13 | 97.0 | 4.00 | 97.5 | 4.80 |
| 13 | 2.5 | 0.07 | 96.8 | 2.87 | 98.0 | 3.18 |
| 14 | 2.5 | 0.13 | 97.1 | 3.90 | 98.2 | 4.93 |

EXAMPLES 15–22

A microporous polysulfone substrate was prepared from a 15% solution of Udel® P3500 in dimethylformamide. The solution also contained 0.2% of a surfactant which is the free acid form of a complex organic phosphate ester (Gafac RE610, from GAF Corp.), and 0.3% water. With the casting knife set at 6 mils, the casting produced on a glass plate was quenched within 3 secs. in an aqueous solution of 2% dimethylformamide, containing m-phenylenediamine as indicated, at 8° C. for two minutes, then extracted in aqueous m-phenylenediamine as indicated for three minutes.

The water-swollen substrate, after this extraction, was rolled free of surface solution with a soft rubber roller, then immersed at room temperature as indicated below in solutions of cyclohexane-1,3,5-tricarbonyl chloride in Freon® TF for the times indicated. After drying for one hour at room temperature, the membranes were extracted in distilled water overnight before testing. The test results were all obtained at 1000 psi ($6.9 \times 10^6$ Pa) after 17 hours of operation at 800 psi ($5.5 \times 10^6$ Pa).

TABLE V

| Example | Concentration of m-Phenylenediamine Quench % w/v | Ext. % w/v | Concentration of Cyclohexane-1,3,5-tricarbonyl chloride % w/v | Reaction Time secs | Rejection % | Kw m·s$^{-1}$·TPa$^{-1}$ |
|---|---|---|---|---|---|---|
| 15 | 1.3 | 1.3 | 0.07 | 15 | 98.7 | 2.68 |
| 16 | 1.3 | 1.3 | 0.07 | 25 | 98.7 | 2.97 |
| 17 | 1.3 | 1.3 | 0.09 | 15 | 98.9 | 3.50 |
| 18 | 1.3 | 1.3 | 0.09 | 25 | 98.5 | 3.16 |
| 19 | 1.0 | 1.0 | 0.08 | 9 | 98.4 | 3.15 |
| 20 | 1.0 | 1.0 | 0.08 | 12 | 96.9 | 3.07 |
| 21 | 1.0 | 1.0 | 0.10 | 9 | 98.4 | 3.48 |
| 22 | 1.0 | 1.0 | 0.10 | 12 | 98.5 | 3.67 |

CONTROL EXAMPLES 23-24

A microporous polysulfone substrate was prepared as in Examples 15-20 with the exception that the castings were quenched within 3 seconds in water at 8° C. After extraction in distilled water overnight at room temperature, the membranes were soaked in 1.3% aqueous m-phenylenediamine at room temperature for the times indicated, before reaction with cyclohexane-1,3,5-tricarbonyl chloride (0.09% w/v) in Freon® TF for the times indicated. After drying for one hour at room temperature the membranes were extracted in water overnight before testing at 1000 psi (6.9×10$^6$ Pa) as in Examples 15-22 after 24 hours of operation at 800 psi (5.5×10$^6$ Pa).

TABLE VI

| Soak in 1.3% MPD (mins) | Reaction secs. | R % | Kw |
|---|---|---|---|
| 6 | 15 | 95.1 | 4.02 |
| 6 | 25 | 93.0 | 3.98 |
| 30 | 15 | 94.3 | 4.00 |
| 30 | 25 | 95.4 | 4.39 |

Here where concentrations were adjusted to increase Kw values, salt rejection levels were unacceptable for seawater desalination.

I claim:

1. A thin film composite membrane prepared by forming a membrane from a solution of a polysulfone in a polar, organic solvent containing from 10 to 20% by weight polysulfone, quenching the resulting membrane in an aqueous bath containing 0.1 to 10% weight/volume m-phenylenediamine, removing the resulting porous polysulfone film containing m-phenylenediamine from the aqueous bath, and immersing said porous polysulfone film in a water immiscible solution comprising 0.05 to 5% weight/volume trimesoyl chloride, cyclohexane-1,3,5-tricarbonyl chloride, or mixtures thereof whereby the m-phenylene diamine reacts with the trimesoyl chloride or cyclohexane-1,3,5-tricarbonyl chloride to form a continuous layer supported by the porous polysulfone membrane.

* * * * *